(12) United States Patent
Huang et al.

(10) Patent No.: US 6,891,296 B1
(45) Date of Patent: May 10, 2005

(54) MAGNETIZING STRUCTURE OF MOTOR

(75) Inventors: Wen-Shi Huang, Taoyuan Hsien (TW); Lin Kuo-Cheng, Taoyuan Hsien (TW); Tsai Ming-Shi, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 56 days.

(21) Appl. No.: 09/685,304

(22) Filed: Oct. 10, 2000

(30) Foreign Application Priority Data

Oct. 13, 1999 (TW) ........................................ 88217381 U

(51) Int. Cl.[7] ................................................. H02K 1/27
(52) U.S. Cl. ........................... 310/156.01; 310/154.01; 310/154.25; 310/156.38
(58) Field of Search ........................ 310/156.01, 156.38, 310/156.43, 156.46, 154.01, 154.21, 154.25, 154.28, 154.29, 267, 261, 216, 152, 154, 156, 254; H02K 1/27

(56) References Cited

U.S. PATENT DOCUMENTS

| 1,566,693 | A | * | 12/1925 | Pletscher | ................... | 310/152 |
|---|---|---|---|---|---|---|
| 4,496,887 | A | * | 1/1985 | Ichihara et al. | ........ | 310/156.46 |
| 5,162,684 | A | * | 11/1992 | Hayakawa | ............. | 310/154.28 |
| 5,753,991 | A | * | 5/1998 | Couture et al. | ........ | 310/156.46 |
| 5,911,453 | A | * | 6/1999 | Boyd et al. | ................. | 310/216 |

FOREIGN PATENT DOCUMENTS

| JP | 2119544 | * | 5/1990 | ............ | H02K/1/27 |
|---|---|---|---|---|---|
| JP | 9-56092 | * | 9/1997 | ............ | H02K/1/27 |

* cited by examiner

Primary Examiner—Burton S. Mullins
Assistant Examiner—Karen Beth Addison
(74) Attorney, Agent, or Firm—Kirkpatrick & Lockhart LLP

(57) ABSTRACT

The present invention provides a structure for magnetizing a rotor magnet of a motor, which includes a rotor having a magnet cylinder with a wavy curve surface and a stator having a plurality of silicon steel sheets wound by a plurality of winding coils. The present invention also provides a structure for magnetizing a stator magnet of a motor, which includes a stator having a magnet cylinder with a wavy curve surface and a rotor having a plurality of silicon steel sheets wound by a plurality of winding coils.

8 Claims, 6 Drawing Sheets

US 6,891,296 B1

MAGNETIZING STRUCTURE OF MOTOR

FIELD OF THE INVENTION

The present invention relates to a magnetizing structure of a motor, and more particularly to a structure for magnetizing a rotor magnet or a stator magnet of a direct current motor.

BACKGROUND OF THE INVENTION

A traditional direct current motor essentially comprises two major components: a rotor and a stator, one of which is made of permanent magnet and the other is an electric magnet, and the one is disposed circumferentially by the other. Between a rotor and a stator, there exists an air gap. In one case, an inner rotor rotates within a stator; in another case, an outer rotor rotates around an inner stator. A permanent magnet incorporated on either a rotor or a stator directs a magnetic field into the air gap, which interacts with another magnetic field of changing polarity to develop the torque for driving a motor.

FIG. 1 shows a magnetizing structure that is commonly found in a motor. Such structure of an outer-rotor type motor includes a rotor 12 having a magnet cylinder 121 with smooth surfaces on both sides and a stator 11 having a plurality of silicon steel sheets 111 wound by a plurality of winding coils 13. When a current is applied to a winding coil, an electric magnetic field is created to repulse the magnetic field caused from the permanent magnet, thereby the rotor rotates and drives an article such as a fan.

The permanent magnet is usually in a shape of cylinder; therefore, the term "magnet cylinder" hereinafter means a cylindrical-shaped magnet, unless otherwise specified.

Since the inductive magnetic field in the silicon steel sheets 111 on the stator 11 must reach to an adequate level for starting a rotor, the traditional method includes steps of increasing quantities of winding coils and broadening the size of the silicon steel sheets. Since the current flowing in a motor is considerably higher than the rated load current during the period of starting a rotor, a motor can be easily damaged through overheating. Thus, increasing quantities of winding coils is neither practical nor effective. In addition, the silicon steel sheet 111 on the stator 11 is customarily designed to be asymmetric for changing the air gap between the stator 11 and rotor 12 during the period of starting, as can be seen in FIG. 1. Because such type of silicon steel sheet is costly, broadening its size is generally not suitable. A locked rotor condition is common in the customarily used motor, which also requires special attention.

Therefore, the present invention provides an improved magnetizing structure for overcoming the problems described above.

SUMMARY OF THE INVENTION

An object of the present invention is to provide a structure for magnetizing a rotor magnet of a motor, which includes a rotor having a magnet cylinder with a wavy curve surface and a stator having a plurality of silicon steel sheets wound by a plurality of winding coils.

Preferably, the wavy curve surface of the magnet cylinder is one of an inner wavy curve surface and an outer wavy curve surface.

Preferably, the wavy curve surface of the magnet cylinder includes a plurality of curve surfaces having different arc centers.

The plurality of silicon steel sheets can be symmetric or asymmetric; preferably, they are symmetrical.

Moreover, the present invention can be applied to not only the outer-rotor type motor but also an inner-rotor type motor.

According to another aspect of the present invention, there is provided a structure for magnetizing a stator magnet of a motor, which includes a stator having a magnet cylinder with a wavy curve surface and a rotor having a plurality of silicon steel sheets wound by a plurality of winding coils.

Certainly, the wavy curve surface of the magnet cylinder can be one of an inner wavy curve surface and an outer wavy curve surface. The wavy curve surface of the magnet cylinder includes a plurality of curve surfaces having different arc centers. The plurality of silicon steel sheets is preferably symmetrical.

According to a further aspect of the present invention, there is provided a structure for magnetizing a rotor magnet of a motor, which includes a rotor having a magnet cylinder with a lumpy edge and a stator having a plurality of silicon steel sheets wound by a plurality of winding coils. The lumpy edge is a combination of a plurality of concave surfaces and a plurality of convex surfaces.

According to a still further aspect of the present invention, there is provided a structure for magnetizing a stator magnet of a motor, which includes a stator having a magnet cylinder with a lumpy edge and a rotor having a plurality of silicon steel sheets wound by a plurality of winding coils. The lumpy edge is a combination of a plurality of concave surfaces and a plurality of convex surfaces.

The above objects and advantages of the present invention will become more readily apparent to those ordinarily skilled in the art after reviewing the following detailed description and accompanying drawings, in which:

DETAILED DESCRIPTION OF THE INVENTION

Figure 1:
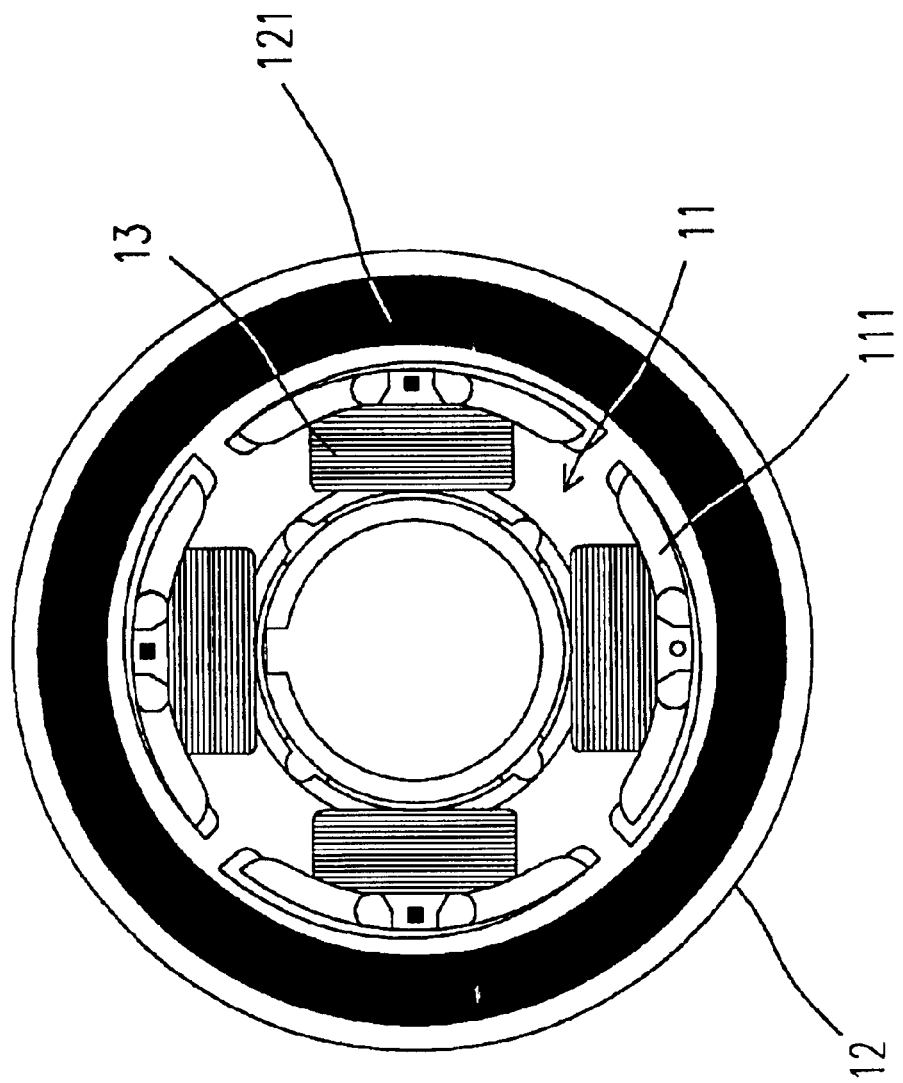
FIG. 1 is a sectional view showing a magnetizing structure of motor according to prior art.
Figure 2:
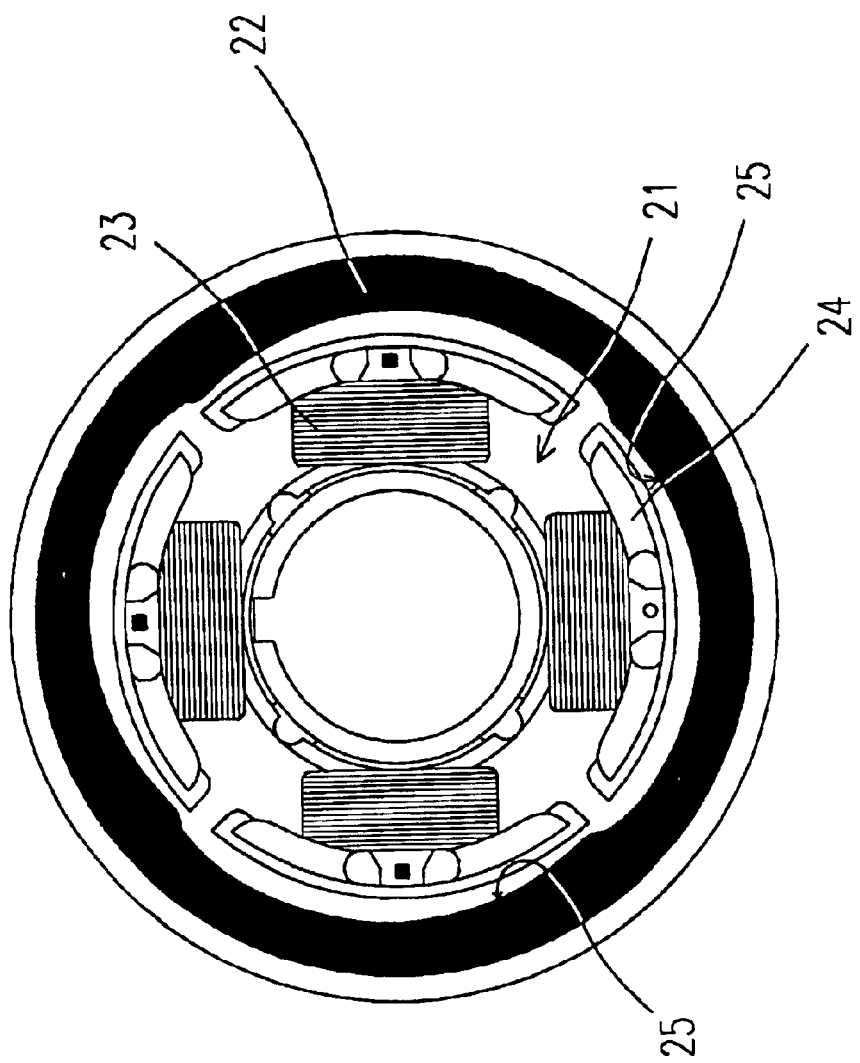
FIG. 2 is a sectional view showing a structure for magnetizing of a rotor having a magnet cylinder with an inner wavy curve according to the first preferred embodiment of the present invention.

Referring to FIG. 2, the first preferred embodiment of the present invention provides a structure for magnetizing a rotor magnet, which includes a rotor having a magnet cylinder 22 with an inner wavy curve surface 25 and a stator 21 having a plurality of silicon steel sheets 24 wound by a plurality of winding coils 23. The silicon steel sheets 24 are symmetrical, which facilitates mass production to reduce cost. Since the magnet cylinder 22 is manufactured by a molding and sintering process, the shape or size of it can be predetermined and the cost is not high. Owing to the inner wavy curve surface 25, the magnet cylinder 22 directs a magnetic field into the air gap for interacting with the inductive magnetic field easily to develop the torque and radiate the internally generated heat.

Figure 3:
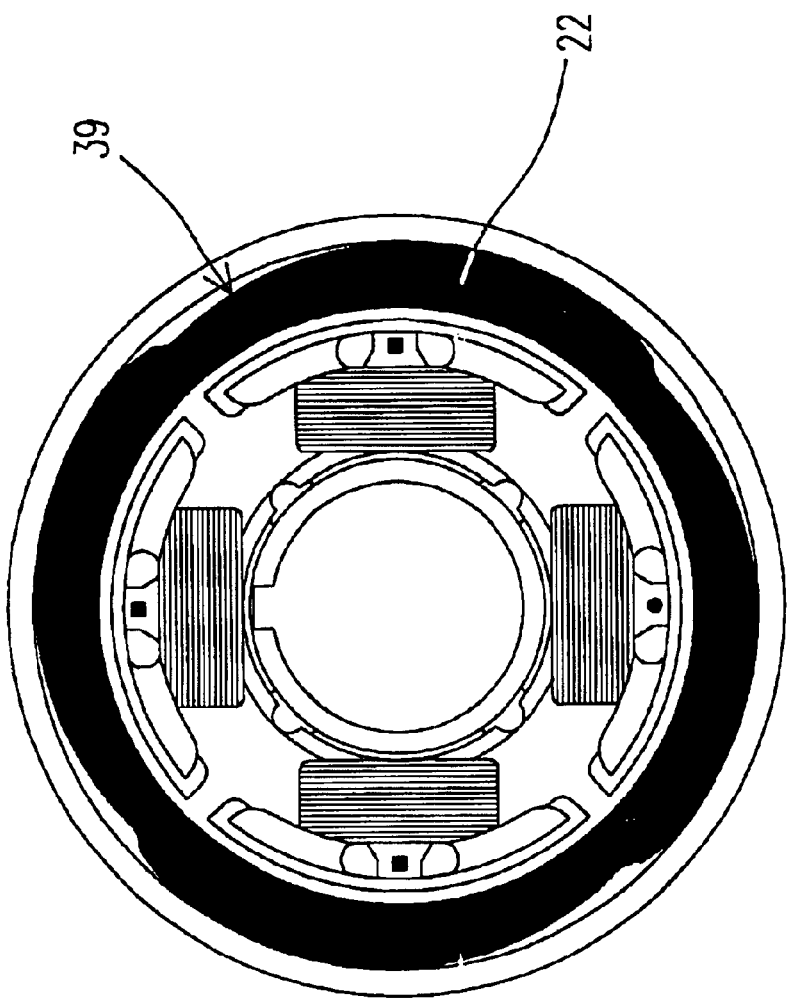
FIG. 3 is a sectional view showing a structure for magnetizing a rotor having a magnet cylinder with an outer wavy curve according to the first preferred embodiment of the present invention.

The structure for magnetizing a rotor magnet shown in FIG. 3 is the same as that in FIG. 2, except that a rotor having a magnet cylinder 22 with an outer wavy curve surface 39.

Figure 4:
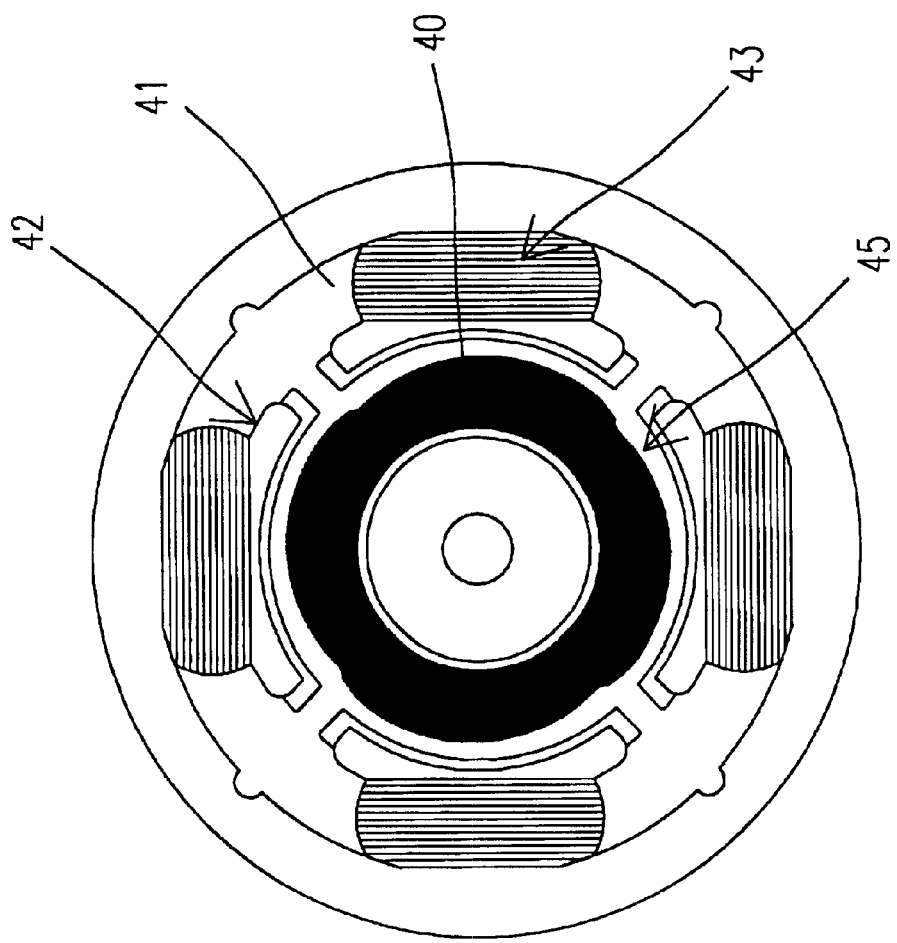
FIG. 4 is a sectional view showing a structure for magnetizing a stator having a magnet cylinder with an outer wavy curve according to the second preferred embodiment of the present invention.

Referring to FIG. 4, the second preferred embodiment of the present invention provides a structure for magnetizing a stator magnet, which includes a stator having a magnet cylinder 40 with an outer wavy curve surface 45 and a stator 41 having a plurality of silicon steel sheets 42 wound by a plurality of winding coils 43. Certainly, the outer wavy curve surface can be replaced with an inner wavy curve surface.

Figure 5:
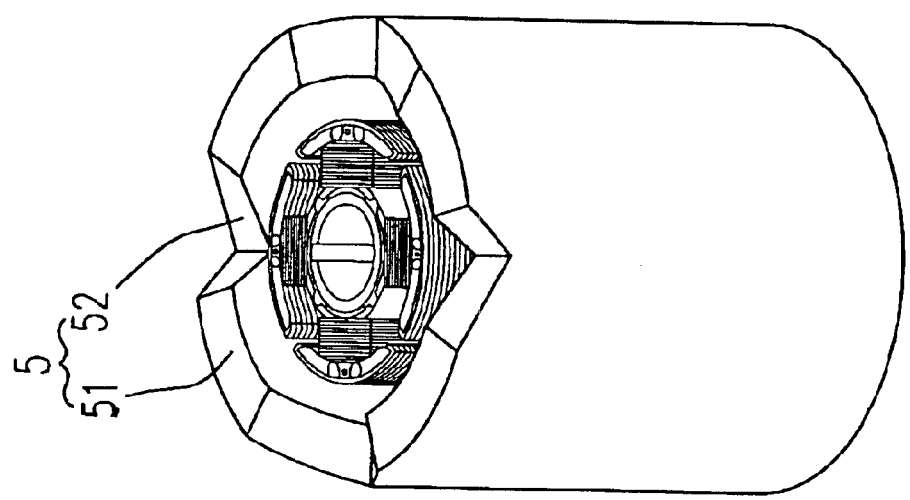
FIG. 5 is a perspective view showing a structure for magnetizing a rotor having a magnet cylinder with a lumpy edge according to the third preferred embodiment of the present invention.
Figure 6:
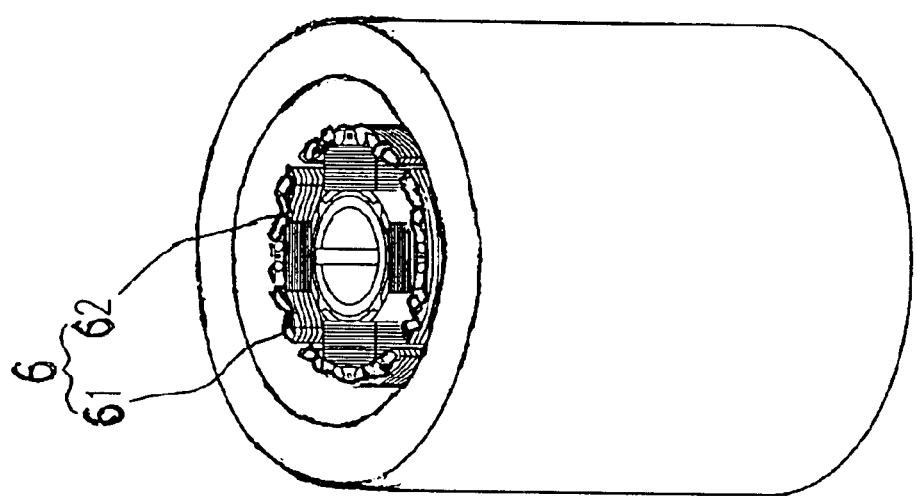
FIG. 6 is a perspective view showing a structure for magnetizing a stator having a magnetic cylinder with a lumpy edge.

Referring to FIG. 5, the third preferred embodiment of the present invention provides a structure for magnetizing a rotor magnet. The structure in FIG. 5 is the same as that in FIG. 2, except that the rotor has a magnet cylinder with a an irregular lumpy edge 5 which is a combination of a plurality of concave surfaces 52 and a plurality of convex surfaces 51. Certainly, a structure for magnetizing a stator magnet is also suitable, wherein the stator has a magnet cylinder with a lumpy edge 6 shown in FIG. 6 which is a combination of a plurality of concave surfaces 62 and a plurality of convex surfaces 61.

As will be apparent from the above description according to the present invention, the improved magnetized structure for magnetizing a rotor magnet or a stator magnet of a direct current motor is suitable to start a motor easily, radiate the internally generated heat quickly and prevent the locked rotor condition.

While the invention has been described in terms of what are presently considered to be the most practical and preferred embodiments, it is to be understood that the invention needs not be limited to the disclosed embodiment. On the contrary, it is intended to cover various modification and similar arrangements included within the spirit and scope of the appended claims which are to be accorded with the broadest interpretation so as to encompass all such modifications and similar structure.

What is claimed is:

1. A structure for magnetizing a rotor magnet of a motor, comprising:

a stator having a plurality of silicon steel sheets wound by a plurality of winding coils; and a rotor, the rotor being a unitary, asymmetric magnet cylinder bounded by an inner surface and outer surface, wherein at least one of said surfaces is a unitary and continuous curve surface comprising a plurality of continuous curve surfaces, each curve surface having convex and concave curve portions for changing an air gap between the rotor and the stator while starting the rotor; and a stator having a plurality of silicon steel sheets wound by a plurality of winding coils.

2. A structure of claim 1, wherein said plurality of silicon steel sheets is symmetrical.

3. A structure for magnetizing a stator magnet of a motor, comprising:

a rotor having a plurality of silicon steel sheets wound by a plurality of winding coils; and a stator, the stator being a unitary, asymmetric magnet cylinder bounded by an inner surface and outer surface, wherein at least one of said surfaces is a unitary and continuous curve surface comprising a plurality of continuous curved surfaces, each curve surface having convex and concave curve portions curve surfaces for changing an air gap between the rotor and the stator while starting the rotor; and a rotor having a plurality of silicon steel sheets wound by a plurality of winding coils.

4. A structure of claim 3, wherein said plurality of silicon steel sheets is symmetrical.

5. A structure for magnetizing a rotor magnet to start a motor easily, comprising:

a rotor, the rotor being a unitary, asymmetric magnet cylinder with an irregular lumpy edge comprising a plurality of concave surfaces and a plurality of convex surfaces for starting the motor easily; and a stator having a plurality of silicon steel sheets wound by a plurality of winding coils and mounted inside said magnet cylinder.

6. A structure for magnetizing a stator magnet to start a motor easily, comprising:

a stator, the stator being a unitary, asymmetric magnet cylinder with an irregular lumpy edge comprising a plurality of concave surfaces and plurality of a convex surfaces for starting the motor easily; and a rotor having a plurality of silicon steel sheets wound by a plurality of winding coils and mounted inside said magnet cylinder.

7. A structure of claim 1, wherein said a plurality of continuous curve surfaces have different arc centers.

8. A structure of claim 3, wherein said a plurality of continuous curve surfaces have different arc centers.

* * * * *